Patented July 25, 1933

1,919,628

UNITED STATES PATENT OFFICE

PER K. FROLICH AND STANLEY P. GILDERSLEEVE, OF ELIZABETH, NEW JERSEY, ASSIGNORS TO STANDARD OIL DEVELOPMENT COMPANY, A CORPORATION OF DELAWARE

DILUTION DETECTOR FOR ANTIFREEZE SOLUTIONS

No Drawing.    Application filed February 16, 1932. Serial No. 593,406.

This invention relates to improvements in anti-freeze compositions, especially adapted for use in the radiators of motor vehicles. In a preferred form of the invention an oil is incorporated with an alcoholic anti-freeze solution which shall indicate adulteration with water to an extent of over 5 or 10%.

A principal object of our invention is to provide a solution of oil in alcohol blends which shall indicate by the physical appearance the additions of water of over 5 or 10%.

Another object of this invention is the addition of an oil to alcoholic anti-freeze solutions, which shall upon dilution with water and use as a cooling agent in the radiators of motor vehicles retard evaporation losses of the alcohol.

A further object of this invention is the addition of an oil to alcoholic anti-freeze solution, which shall upon dilution with water give a milky suspension and thereby discourage the use of the aqueous alcohol solutions as beverages.

We are aware that oxidized oils and light oils such as kerosene have been added in small amounts to alcoholic anti-freeze solutions to check evaporation. These oils are relatively soluble in the alcoholic anti-freeze solutions and do not give milky suspensions upon the addition of small amounts of water to show that the alcoholic anti-freeze solutions have been diluted.

Other oils such as vegetable oil, for example, castor oil are known to be readily soluble in alcoholic solutions but owing to the solubility of the oil in alcoholic solutions, considerable water is required to throw the oils out of solution.

We have found that an addition of a petroleum distillate heavier than kerosene such as gas oil, fuel oil, etc. is suitable for use as a dilution anti-freeze detector. Gas oil is especially adapted to detect the dilution with water of an alcoholic anti-freeze solution composed of 35% of methanol in isopropanol, or of denatured alcohol.

The following table is illustrative:

| Percent of gas oil added to anti-freeze | Percent of water necessary to add to produce a cloud at 70° F. |
|---|---|
| 5 | 4 |
| 4 | 4.8 |
| 3 | 7.8 |
| 2 | 11.0 |

At 0° F. a 2% solution of gas oil in the alcohol blend turned milky on the addition of 4 to 5% of water.

A heavier oil such as fuel oil having an A. P. I. gravity of about 25 to 30 is also found to be suitable for use as a water dilution detector. For example, 2% of fuel oil in denatured alcohol will readily show a milky suspension upon the addition of 5% of water.

In the appended claims petroleum distillates heavier than kerosene are to be understood as having a specific gravity greater than 0.8 and a final boiling point above 572° F.

The foregoing description is merely illustrative and various changes and alternative arrangements may be made within the scope of the appended claims in which it is our intention to claim all novelty inherent in the invention as broadly as the prior art permits.

We claim:

1. An anti-freeze composition comprising a water soluble alcohol and a small amount of a petroleum distillate heavier than kerosene, said distillate having the property of causing the composition to form a milky suspension upon the addition of 5% or more of water.

2. The composition according to claim 1 in which the alcohol is 35% of methanol in isopropanol.

3. The composition according to claim 1 in which the alcoholic anti-freeze solution is denatured alcohol.

4. An anti-freeze composition comprising about 5% of a petroleum distillate heavier than kerosene dissolved in an alcoholic anti-freeze solution, said distillate having the property of causing the composition to form a milky suspension upon the addition of 4% of water at 70° F.

5. An anti-freeze composition comprising about 5% of a petroleum distillate heavier than kerosene and dissolved in alcohol, said distillate having the property of causing the composition to form a milky suspension upon the addition of 5% of water.

6. The composition according to claim 5 in which the petroleum distillate is gas oil.

7. The composition according to claim 5 in which the petroleum distillate is fuel oil.

PER K. FROLICH.
STANLEY P. GILDERSLEEVE.